(12) United States Patent
Takada

(10) Patent No.: US 9,140,574 B2
(45) Date of Patent: Sep. 22, 2015

(54) MAP DISPLAY APPARATUS USING DIRECTION/DISTANCE MARK

(75) Inventor: Takayuki Takada, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 190 days.

(21) Appl. No.: 13/538,375

(22) Filed: Jun. 29, 2012

(65) Prior Publication Data

US 2013/0066550 A1 Mar. 14, 2013

(30) Foreign Application Priority Data

Sep. 13, 2011 (JP) ................................. 2011-199169

(51) Int. Cl.
*G01C 21/32* (2006.01)
*G01C 21/36* (2006.01)

(52) U.S. Cl.
CPC .......... *G01C 21/367* (2013.01); *G01C 21/3682* (2013.01)

(58) Field of Classification Search
CPC .......................... G01C 21/367; G01C 21/3682
See application file for complete search history.

(56) References Cited

U.S. PATENT DOCUMENTS

| | | | | |
|---|---|---|---|---|
| 5,212,643 | A * | 5/1993 | Yoshida | 701/455 |
| 7,548,814 | B2 * | 6/2009 | Pantalone et al. | 701/455 |
| 7,715,981 | B2 * | 5/2010 | Bradley et al. | 701/426 |
| 7,743,337 | B1 * | 6/2010 | Maeda et al. | 715/781 |
| 7,844,915 | B2 * | 11/2010 | Platzer et al. | 715/781 |
| 7,894,984 | B2 * | 2/2011 | Rasmussen et al. | 701/452 |
| 7,933,716 | B2 * | 4/2011 | Dropps et al. | 701/455 |
| 8,095,307 | B2 * | 1/2012 | Ebert et al. | 701/455 |
| 8,468,469 | B1 * | 6/2013 | Mendis et al. | 715/863 |

FOREIGN PATENT DOCUMENTS

| | | |
|---|---|---|
| JP | 09-081032 | 3/1997 |
| JP | 2002-116044 | 4/2002 |
| JP | 2006-090962 | 4/2006 |
| JP | 2007-071587 | 3/2007 |
| JP | 2010-032348 | 2/2010 |
| JP | 2010-085359 | 4/2010 |

OTHER PUBLICATIONS

JPO Office Action for Japanese Application No. 2011-199169 dispatched on Nov. 11, 2014, 6 pages, including English translation.

* cited by examiner

*Primary Examiner* — John Q Nguyen
*Assistant Examiner* — Alan D Hutchinson
(74) *Attorney, Agent, or Firm* — Brinks Gilson & Lione

(57) ABSTRACT

A direction/distance mark is displayed on a map, wherein the direction/distance mark shows a direction line indicating a direction, with a reference point of a map screen being located in a center, a plurality of equidistant circles with the reference point being located in the center, and a distance from the reference point indicated by each equidistant circle. An instructed point on the screen that is touched by a user is detected as a point indicating a direction on the direction/distance mark and a distance from the reference point, and a map including the point is displayed. Accordingly, with one-touch, the currently displayed map can be scrolled to a desired map. Using the same direction/distance mark, it is also possible to display an equidistant range specifying map, a configured range specifying map, and a POI display map.

18 Claims, 10 Drawing Sheets

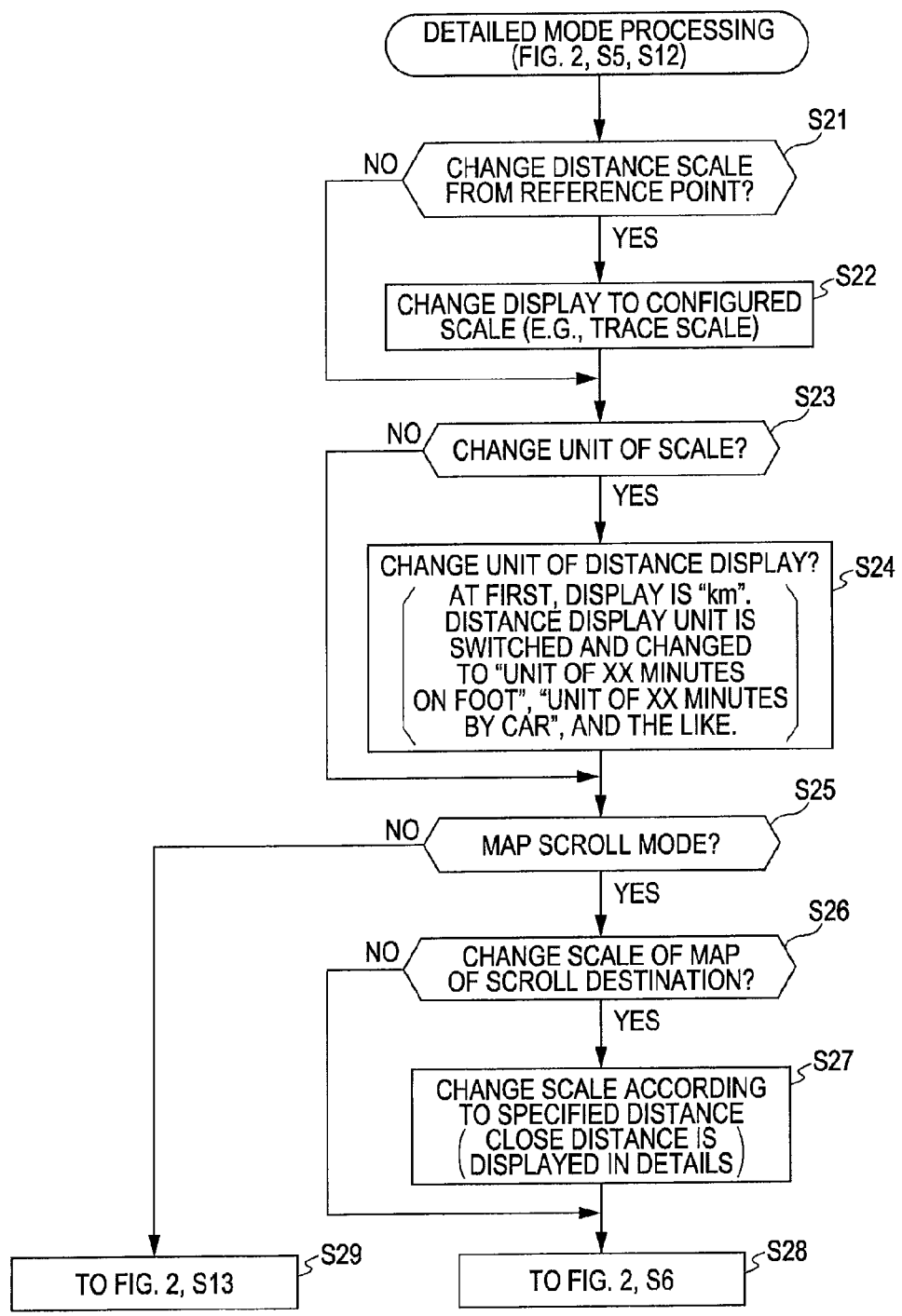

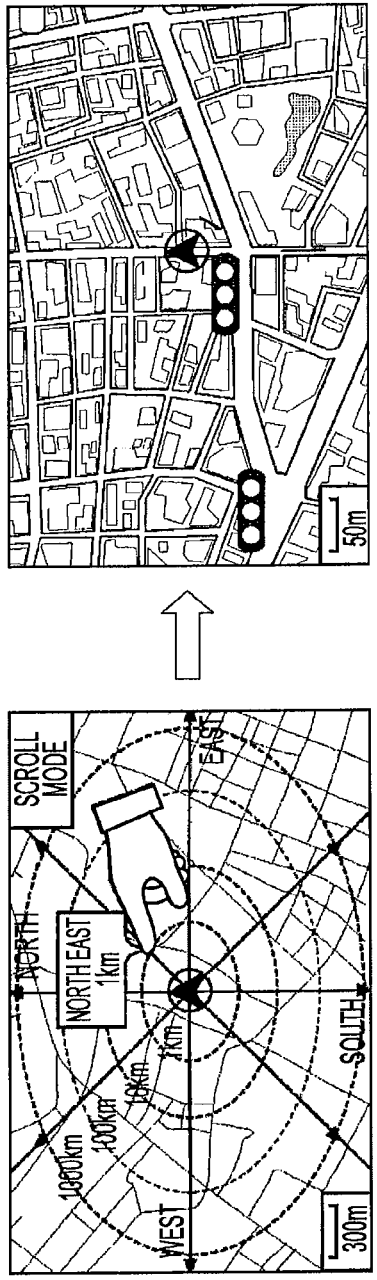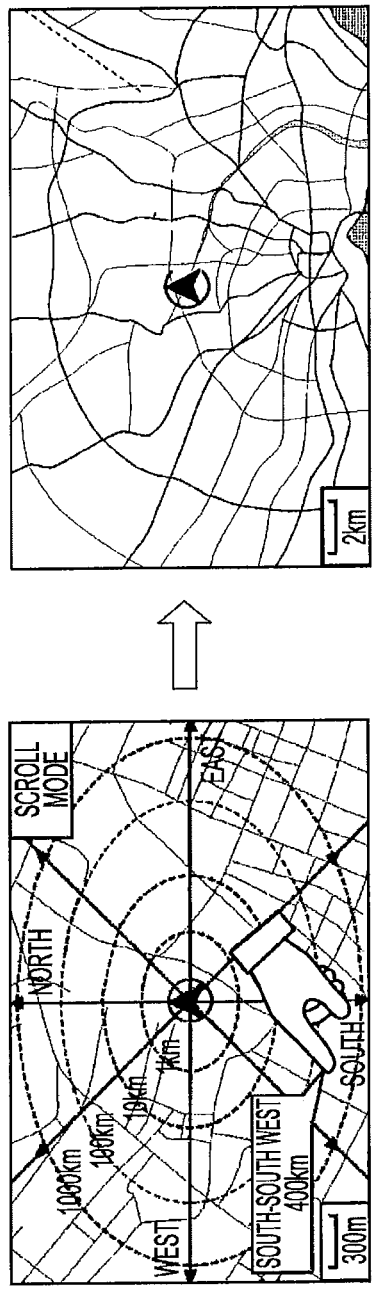

*FIG. 8A*
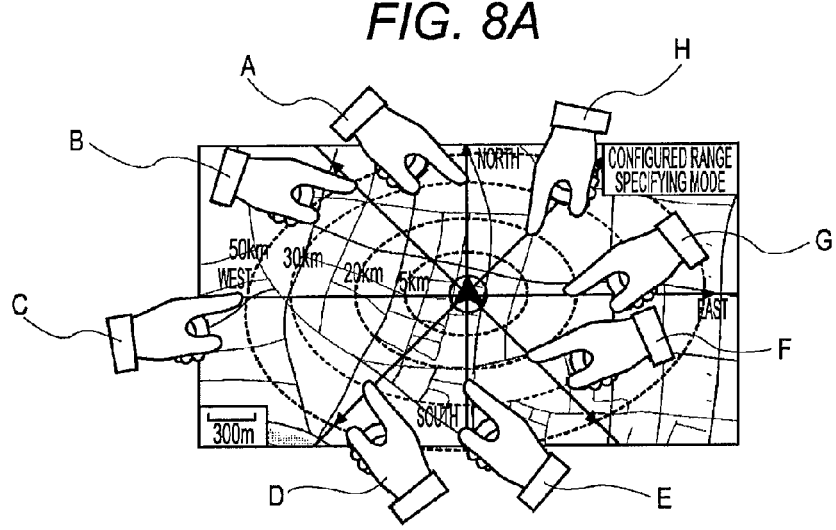
*FIG. 8B*
| INSTRUCTED POINT | DIRECTION | DISTANCE |
|---|---|---|
| A | NORTH | 30km |
| B | NORTH WEST | 40km |
| C | WEST | 50km |
| D | SOUTH WEST | 30km |
| E | SOUTH | 25km |
| F | SOUTH EAST | 20km |
| G | EAST | 20km |
| H | NORTH EAST | 20km |
*FIG. 8C*
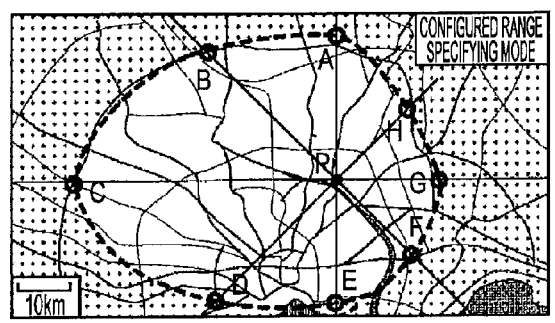

⇩ CHANGE SCALE
(TO LARGE AREA MAP)

MAP DISPLAY APPARATUS USING DIRECTION/DISTANCE MARK

PRIORITY CLAIM

This application claims the benefit of Japanese Patent Application No. 2011-199169, filed on Sep. 13, 2011, and which is incorporated by reference herein in its entirety.

BACKGROUND

1. Field of the Invention

The present invention relates to a map display apparatus using a direction/distance mark, which easily displays a desired map using the mark indicating a direction from a reference point and a distance from the reference point which is displayed on a screen when various kinds of maps are displayed.

2. Description of Related Art

A map has been widely used and displayed not only by a vehicle navigation apparatus but also by a cellular phone, a portable information terminal, a personal computer, and the like. When such maps are used, a person may want to cause, for example, a navigation apparatus to display another desired map from a currently displayed map, in order to, e.g., confirm a destination to which the person is going to visit.

In such a case, for example, when an address of a location to be displayed is known, a map around the address can be immediately displayed by directly inputting that address. However, when the address is not known, or the address is unclear, a desired map cannot be displayed. In addition, it is troublesome to input the address, and in particular, when the map is displayed with the vehicle navigation apparatus, a person who uses the map is mainly a driver, and therefore, it is dangerous for the driver to do many troublesome steps to display the map, which is not preferable.

When a person wants to display another map from a currently displayed map, a desired map may also be displayed by scrolling the map. This method is less troublesome than inputting the address as described above, and another map can be displayed easily. Not only the navigation apparatus as described above but also other apparatuses widely use this method to display maps.

In order to scroll a map, for example, a direction in which a map is moved may be instructed with a joy stick, and a moving speed may be adjusted according to the amount of inclination of the joy stick. But this method requires an operation device, i.e., the joy stick, and when the vehicle navigation apparatus has the joy stick provided on a remote controller thereof, it is dangerous for the driver to manipulate the remote controller during driving. On the other hand, attaching the joy stick to the vehicle or the navigation apparatus itself means that a projecting object exists at the front of the vehicle, which is not preferable.

Therefore, in recent years, a touch panel is pasted to the vehicle navigation apparatus or the screen of various kinds of portable devices, and the user can perform a predetermined function by touching various kinds of operation portions displayed on the screen with a finger and the like. By using this function, a direction is detected in which the finger and the like touch and trace the screen while a map is displayed, the displayed map is scrolled and displayed as if the displayed map is moved.

Japanese Patent Application Laid-Open (JP-A) No. H9-81032 discloses a technique for displaying a scroll menu having marks with 45 degrees intervals, instructing one of them with a mouse cursor, and having a scroll speed according to a distance between an instructed point and a mark start point. Japanese Patent Application Laid-Open (JP-A) No. 2006-90962 discloses a technique for detecting a length for which a finger comes into contact with and moves on a touch panel display and scrolling a map by detecting a moving direction.

Further, Japanese Patent Application Laid-Open (JP-A) No. 2002-116004 discloses a technique for, in each direction at the top, bottom, right, and left of the screen with respect to a display point displayed on a current screen, searching any number of points such as adjacent cities, towns, villages, regions, and adjacent prefectures, displaying them in portions located in the respective directions of the screen in order, wherein a user performs scroll operation for the amount of operation defined in advance in accordance with the degree of distance from the current point in a direction in which the user, who sees this, considers a desired point exists, and the map is jumped to that region by detecting this, and this is displayed with a predetermined scale.

As described above, for map-displaying process of the vehicle navigation apparatus and various kinds of portable devices, it is effective to paste the touch panel to the surface of the screen displaying the map and scroll the map when the user traces the surface of the screen. When the screen is moved by simply detecting the direction in which the screen is traced, it takes much time to display a distant map. In particular, as illustrated in FIG. 10A, for example, when it is desired to display a distant map by performing scroll operation while a detailed map with a small scale is currently displayed, an extremely large amount of operation and much time are required if the screen is scrolled by simply tracing the screen with the finger and the like as it is.

For this reason, in such a case, the scale of the map is temporarily enlarged as illustrated in FIG. 10B, and the screen is traced while a large region map is displayed, so that the distant map can be displayed in a relatively short time from the detailed map display-state of FIG. 10A. In this method, however, how much degree the scale of the map is changed relies on user's intuition.

In addition, in many cases, the following complicated operation has to be performed: after the map is roughly scrolled to an approximate region, the scale is changed to the detailed map side, and when the desired point is out of the display range in that case, scroll operation is performed on the screen, whereby a desired, detailed map is gradually displayed with the desired point being substantially located in the center of the screen.

Further, a method for displaying a distant map at a relatively high speed without changing the scale to the wide region side as described above even when a detailed map is displayed includes a method in which the direction of scrolling is the direction of tracing with the finger, and the scroll speed is gradually increased as the screen is touched with the finger for a longer period of time in that state.

In this method, however, the distant map is displayed at a high speed while the detailed map is still used, and accordingly, the farther the map is, the more difficult it is to understand how much distance the map is scrolled at the present moment and what kind of region is scrolled and displayed at the present moment. When the screen is scrolled by tracing the screen with the finger and the like as described above, it is necessary to keep on touching the screen until a desired map is displayed, and in particular, it is dangerous for a driver to continue this kind of operation for a long period of time with the vehicle navigation apparatus.

SUMMARY

Accordingly, it is a main object of the present invention to provide a map display apparatus using a direction/distance mark, wherein when a map is scrolled by detecting user's operation on a touch panel pasted to a map display screen, a direction of a map to be displayed and a distance from a current position can be specified with a single touch, and using a similar method, an equal distance range from a specified point can be easily known, and in addition, a desired range on a map can be easily specified.

Another map display apparatus using the direction/distance mark according to the present invention is based on the map display apparatus using the direction/distance mark, wherein the map display means displays a map including the point detected by the instructed point detecting means, with a same scale as that of a map currently displayed.

Another map display apparatus using the direction/distance mark according to the present invention is based on the map display apparatus using the direction/distance mark, wherein the map display means displays the map including the point detected by the instructed point detecting means, in such a manner that in accordance with the distance from the reference point that is detected by the instructed point detecting means, a scale for displaying a more detailed map is selected as the distance is smaller.

Another map display apparatus using the direction/distance mark according to the present invention is based on the map display apparatus using the direction/distance mark, wherein the map display apparatus using the direction/distance mark is used as a map display apparatus of a ship navigation apparatus.

In order to solve the above problems, another map display apparatus using a direction/distance mark according to the present invention is characterized by including map display means for displaying a map on a screen, direction/distance mark display means for displaying a direction line indicating a direction with a reference point of a screen being located in a center, a plurality of equal distance circles with the reference point being located in the center, and a distance from the reference point indicated by each equal distance circle, and instructed point detecting means, wherein when the direction/distance mark display means displays the direction/distance mark, the instructed point detecting means detects an instructed point on the screen that is touched, as a point indicating a distance from the reference point on the direction/distance mark, wherein the map display means displays a map including an equal distance range of a distance from the reference point detected by the instructed point detecting means.

Another map display apparatus using the direction/distance mark according to the present invention is based on the map display apparatus using the direction/distance mark, wherein the map display means displays upon selecting a scale with which the equal distance range of the distance from the reference point detected by the instructed point detecting means is displayed as a large size on the screen.

In order to solve the above problems, another map display apparatus using a direction/distance mark according to the present invention is characterized by including map display means for displaying a map on a screen, direction/distance mark display means for displaying a direction line indicating a direction with a reference point of a screen being located in a center, a plurality of equal distance circles with the reference point being located in the center, and a distance from the reference point indicated by each equal distance circle, and an instructed point detecting means, wherein when the direction/distance mark display means displays the direction/distance mark, the instructed point detecting means detects an instructed point on the screen that is touched, as a point indicating a distance from the reference point on the direction/distance mark, wherein the map display means displays a map including an equal distance range of a distance from the reference point detected by the instructed point detecting means.

Another map display apparatus using the direction/distance mark according to the present invention is based on the map display apparatus using the direction/distance mark, wherein the map display means displays upon selecting a scale with which the range detected by the instructed range detecting means is displayed as a large size on the screen.

Another map display apparatus using the direction/distance mark according to the present invention is based on the map display apparatus using the direction/distance mark, wherein the instructed range detected by the instructed range detecting means is also used as a running prohibition section of a navigation apparatus.

In order to solve the above problems, another map display apparatus using a direction/distance mark according to the present invention is characterized by including map display means for displaying a map on a screen, direction/distance mark display means for displaying a direction line indicating a direction with a reference point of a screen being located in a center, a plurality of equal distance circles with the reference point being located in the center, and a distance from the reference point indicated by each equal distance circle, and POI data searching means for searching POIs from map data, wherein when the direction/distance mark display means displays the direction/distance mark, the map display means displays, in an overlapping manner, a POI searched by the POI data searching means at a position corresponding to a distance from the reference point and a direction on the direction/distance mark.

Another map display apparatus using the direction/distance mark according to the present invention is based on the map display apparatus using the direction/distance mark, wherein when a user specifies a search range of POI using the distance from the reference point, the direction/distance mark display means displays the distance from the reference point of an outermost circle of the equal distance circles, in accordance with a distance from the reference point specified by the user.

Another map display apparatus using the direction/distance mark according to the present invention is based on the map display apparatus using the direction/distance mark, wherein the direction/distance mark display means includes distance scale change means for changing a scale of the equal distance circle by changing a distance display from the reference point indicated by each equal distance circle of the direction/distance mark.

Another map display apparatus using the direction/distance mark according to the present invention is based on the map display apparatus using the direction/distance mark, wherein the scale of the equal distance circle is changed by detecting a tracing operation in a direction in which two fingers touching a touch panel pasted to the screen are moved away from each other or in a direction in which the two fingers are brought closer to each other.

Another map display apparatus using the direction/distance mark according to the present invention is based on the map display apparatus using the direction/distance mark, wherein the direction/distance mark display means includes distance display unit selecting means for selecting, from among a plurality of units prepared in advance, a unit of distance display from the reference point indicated by each equal distance circle of the direction/distance mark.

Another map display apparatus using the direction/distance mark according to the present invention is based on the map display apparatus using the direction/distance mark, wherein the distance display unit selecting means selects a unit of m or km.

Another map display apparatus using the direction/distance mark according to the present invention is based on the map display apparatus using the direction/distance mark, wherein the distance display unit selecting means selects a unit indicating how much time it takes on foot.

Another map display apparatus using the direction/distance mark according to the present invention is based on the map display apparatus using the direction/distance mark, wherein the distance display unit selecting means selects a unit indicating how much time it takes by car.

Another map display apparatus using the direction/distance mark according to the present invention is based on the map display apparatus using the direction/distance mark, wherein the direction/distance mark display means displays a distance from the reference point indicated by each equal distance circle in such a manner that a distance between each equal distance circle increases as it is farther away from the reference point.

Another map display apparatus using a direction/distance mark according to the present invention is characterized in using a combination of each of the above map display apparatus using the direction/distance mark.

Since the present invention has been configured as described above, when a map is scrolled by detecting user's operation on a touch panel pasted to a map display screen, a direction of a map to be displayed and a distance from a current position can be specified with a single touch, and by using similar method, an equal distance range from a specified point can be easily known, and in addition, a desired range on a map can be easily specified, and desired POIs can be displayed easily in an easy-to-see manner.

BRIEF DESCRIPTION OF THE DRAWING

FIG. 3 is an action flow diagram of a detailed mode of steps S5 and S12 of FIG. 2;

FIGS. 5A to 5D are figures illustrating another action form of the map scroll mode;

FIGS. 8A to 8C are figures illustrating an action form of the configured range specifying mode according to the present invention;

FIGS. 9A and 9B are explanatory diagrams of the POI display mode according to the embodiment of the present invention, wherein FIG. 9A is an action flow diagram, and FIG. 9B is a figure illustrating a display form.

DETAILED DESCRIPTION

Figure 1:
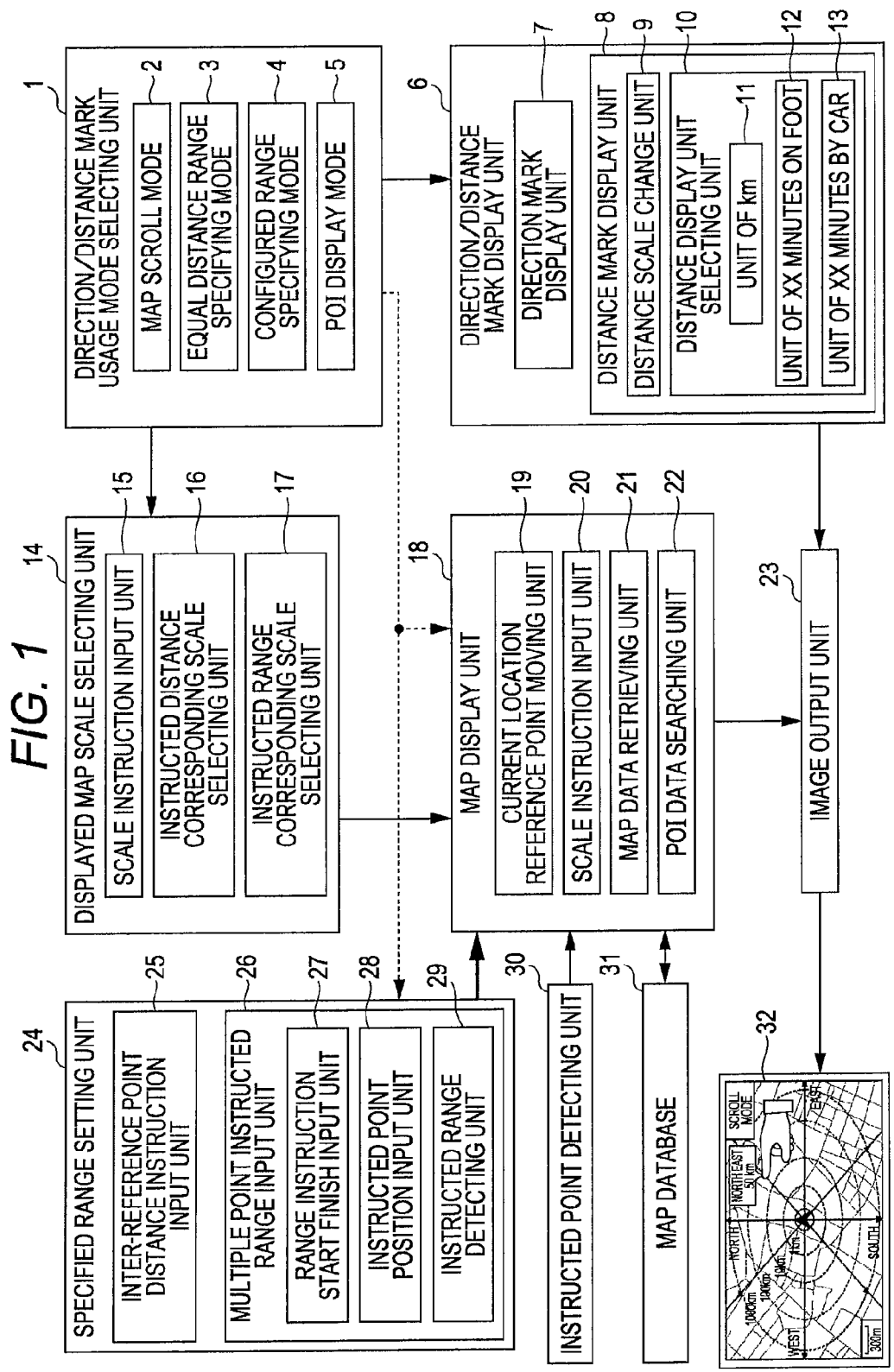
FIG. 1 is a functional block diagram of an embodiment of the present invention.

An embodiment of the present invention will be explained with reference to the drawings. FIG. 1 is a functional block diagram for carrying out the present invention, and illustrates an example in which the present invention can be carried out in various kinds of forms. Therefore, the present invention can be carried out in various kinds of forms by selecting functional blocks therein. It should be noted that each functional unit in FIG. 1 may also be referred to as means for performing each function.

In the functional block diagram as illustrated in FIG. 1, various kinds of forms which are respectively different can be carried out using display of a direction/distance mark according to the present invention, and therefore, these main functions thereof are selectable as "modes" by a direction/distance mark usage mode selecting unit 1. Therefore, these functions can be used by, e.g., selecting any used mode of the various kinds of modes as illustrated in FIG. 1 when the direction/distance mark is displayed, or instructs use of any one of the modes while another function is performed.

The direction/distance mark usage mode selecting unit 1 as illustrated in FIG. 1 includes a map scroll mode 2, and in this mode as explained later, a function is performed such that a user instructs a point using a function of a touch panel and the like with respect to "direction/distance mark" displaying a direction mark serving as an index of direction with a central position of a map screen being a reference point, displaying circles or ellipses in multiple concentric circle manner with the reference point being located in the center, indicating distances from the reference point, and displaying a scale indicating whether each concentric circle indicates, e.g., how many kilometers or meters from the reference point, and a map at that point is immediately displayed.

In the equal distance range specifying mode 3, a function is performed such that, by instructing any one of distance scales indicated by the concentric circles on the screen displaying the direction/distance mark as described above, a map in a range of an equal distance is displayed with an appropriate scale, with the reference point of the currently displayed map being located in the center.

In the configured range specifying mode 4, a function is performed such that a user instructs three or more multiple points on the screen displaying the direction/distance mark as described above, so that a specified range is displayed as a map screen of an appropriate scale.

In the POI display mode 5, a function is performed such that, a POI (Points Of Interest) in that map that matches a condition specified in advance is searched from a map database on the screen displaying the direction/distance mark as described above, and this is displayed at a corresponding position of the direction/distance mark.

As described above, direction/distance mark usage modes include modes for performing various kinds of modes. In addition, by using this direction/distance mark, not only various kinds of functions can be performed, but also, for example, by combining the map scroll mode 2, the equal distance range specifying mode 3, and the POI display mode 5, various kinds of modes can be combined and used, e.g., automatically displaying, in the POI display mode, on a screen after scroll or a map screen after an equal distance range is specified and displayed. With mode selection with the direction/distance mark usage mode selecting unit 1, each functional unit such as the direction/distance mark display unit 6 performs operation corresponding to the mode.

Figure 4A:
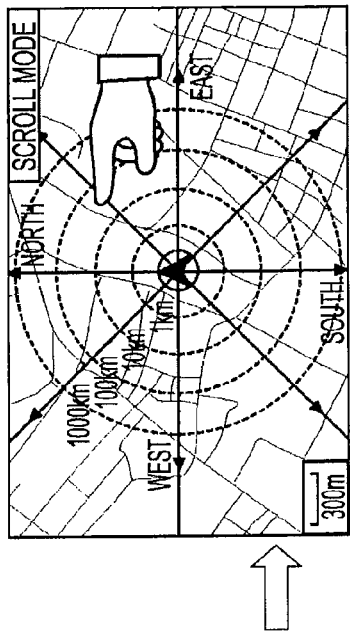
FIGS. 4A to 4D are figures illustrating an action form of a scroll mode according to the present invention.
Figure 4B:
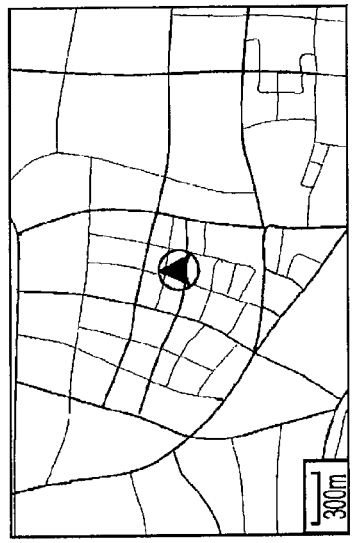
Figure 4C:
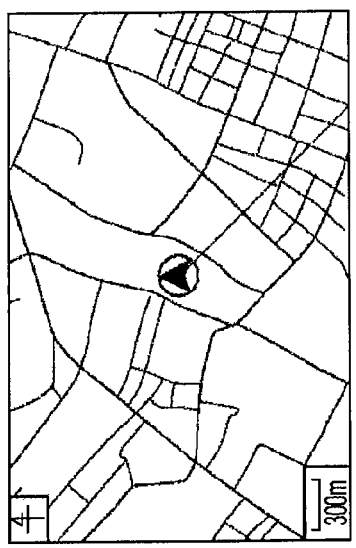

As illustrated in FIGS. 4B and 4C, as described above, the direction/distance mark display unit 6 displays a direction mark serving as an index of direction with the central position of the map screen being the reference point, and displays circles [FIG. 4B] or ellipses [FIG. 4C] in multiple concentric circle manner which represent distances from the reference point with the reference point being located in the center, thereby displaying the "direction/distance mark" displaying a scale indicating how far each concentric circle is from the reference point in km, m, or the like.

For this, in the direction/distance mark display unit 6 as illustrated in FIG. 1, the direction mark display unit 7 displays, as illustrated in FIG. 4 explained above, not only direction marks indicating north, south, east, and west, in four directions from the reference point at the center of the screen but also direction marks indicating north west, southwest, southeast, and northeast which are directions in the middle of each of them. In addition, as necessary, further detailed direction marks can also be displayed, but a direction mark indicating only north, south, east, and west may also be displayed.

The distance mark display unit 8 uses concentric circle about the reference point as illustrated in FIG. 4B or concentric ellipses as illustrated in FIG. 4C to show that points on the line are at the same distance from the reference point. Although the feeling of distance from the reference point can be easily understood if the concentric circles are used as illustrated in FIG. 4B, the reason why the ellipses as illustrated in FIG. 4C are used is that an ordinary monitor displaying a map is often a wide screen display monitor in recent years in particular, and the ellipses are used to effectively use the horizontally long screen in particular and increases the distances between each of them.

The distance mark display unit 8 displays not only circles or ellipses indicating equal distances as described above but also a scale indicating how far each line is away from the reference point at that occasion. The example of FIGS. 4B and 4C shows a case where 1 km, 10 km, 100 km, and 1000 km are displayed from the side of the reference point which is the center of the circles drawn.

Such scale may be set in any manner as necessary, and for example, even if the farthest circle is 1000 km, which is the same as the above, the scale may be displayed upon being changed to as follows: for example, 500 km, 100 km, 10 km toward the inside therefrom. In any of these cases, even though distance circles of equal interval are displayed, distances corresponding to intervals of lines at the outer side are increased, so that this enables, in a wide range, instruction and display in a far range even with a rough position, and enables instruction, display, and the like of a more detailed point in a closer range.

The distance mark display unit 8 as illustrated in FIG. 1 includes the distance scale change unit 9. Even when a scale is displayed in which 1000 km is at the outermost side such as those in FIGS. 4B and 4C explained above during normal operation, a map at such a far location is not necessary, and when a user wants to scroll in a relatively close range, that distance scale is changed such that, e.g., 10 km is at the outermost side as described in FIGS. 6A and 6B explained later, for example.

Figure 6B:
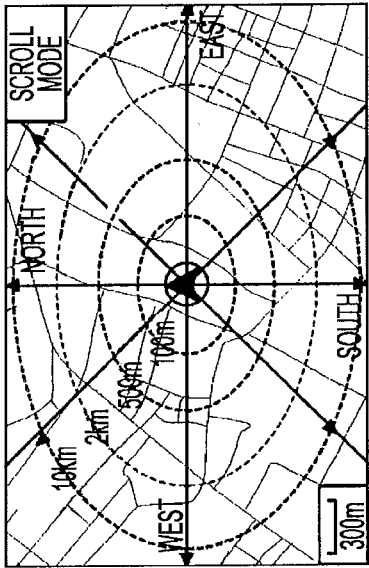
FIGS. 6A to 6D are figures illustrating still another action form of the map scroll mode.

Even when the scale display in units of "km" such as 10 km as illustrated in FIGS. 4B and 4C explained above is adopted as a standard in a unit of km 11, the distance display unit selecting unit 10 displays as follows. In a unit of minute on foot 12, when this is selected according to an instruction of a user, the distance display unit selecting unit 10 displays an indicating allowing direct input as to how many minutes it takes on foot, e.g., "XX minutes on foot" as illustrated in FIG. 6C, for example.

Figure 6D:
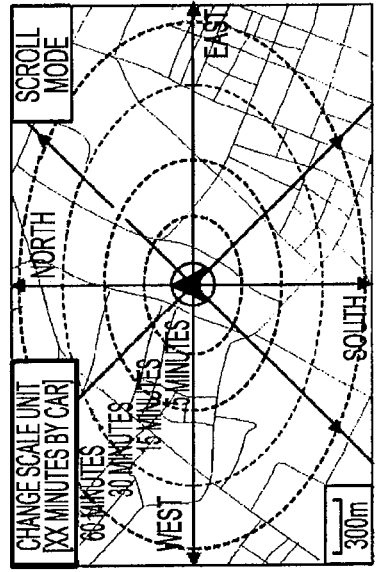

In a unit of minute by car 13, when this is selected according to an instruction given by a user, a scale in unit of "XX minutes by car" is displayed as illustrated in FIG. 6D, for example. With such change of unit display, when guidance of various kinds of facilities has guidance such as "get off at XX station", "walk to the south for XX minutes on foot", "go to the north from XX interchange for 10 minutes", and the like, the point in question can be easily searched. The display data of the direction/distance mark displayed and processed by the direction/distance mark display unit 6 as described above can be output to the image output unit 23, and as described later, the display data of the direction/distance mark can be displayed, in an overlapping manner, on a map image given by the map display unit 18 explained later.

When the user gives a certain instruction according to various kinds of modes such as scroll instruction of a map on the direction/distance mark display screen, and with that instruction, certain map display process is performed such as displaying a map of a scroll destination, the displayed map scale selecting unit 14 performs a function of appropriately selecting the scale of the map. The scale instruction input unit 15 therein reads an instruction of scale set in advance by the user, or when, for example, at scroll instruction, the user instructs an appropriate scale when the user wants to display a detailed map from the first place, that instruction is input here.

For example, when the map scroll mode 1 is the detailed mode in which detailed setting is made even when a map at a scroll destination is displayed with the scale of the map set in advance such as the currently displayed map in the normal mode for performing normal operation, the instructed distance corresponding scale selecting unit 16 selects a scale corresponding to an instructed point as follows. For example, when a relatively close point is instructed as illustrated in FIG. 5A, the instructed distance corresponding scale selecting unit 16 displays a detailed map with a small scale in accordance with the distance thereof as illustrated in FIG. 5B, and on the contrary, when a relatively far point is instructed as illustrated in FIG. 5C, the instructed distance corresponding scale selecting unit 16 displays a large region map with a large scale as illustrated in FIG. 5D in accordance thereto.

For example, the equal distance range specifying mode 3 or the configured range specifying mode 4 is selected, the instructed range corresponding scale selecting unit 17 performs scale selection for displaying upon selecting an appropriate scale in order to display the specified range in as large area of the display screen as possible, i.e., in order not to display only a portion thereof. The scale of the map selected by the displayed map scale selecting unit 14 as described above is output to the map display unit 18 explained later.

The map display unit 18 is to perform not only conventional normal map display process but also map display process peculiar to the present invention. For example, in many cases, in an ordinary navigation apparatus, a current location reference point moving unit 19 therein displays a current location mark at a lower portion of a screen in order to display the current location mark in such a manner that a direction in which a vehicle proceeds is displayed widely, but in the present embodiment, the reference point of the direction/distance mark is preferably arranged in the center of the screen in order to allow the user to easily give an instruction by displaying the direction/distance mark as described above. For this reason, when the direction/distance mark is displayed, no matter where the current location mark is located on the screen, it is moved and displayed so that the current location exists at the reference point of the direction/distance mark.

At that occasion, in order to allow the user to have correct sense of direction in which the map is to be scrolled, it is preferable to display the map upon changing the direction of the map in accordance with the direction of the direction/distance mark displayed on the screen. In the present invention, however, the current map display is not necessarily aligned with the direction/distance mark, and it is also possible to operate the present invention by detecting only the user's instruction with respect to the direction/distance mark, disregarding the map display.

The scale instruction input unit 20 in the map display unit 18 receives the scale instruction of the map selected as described above by the displayed map scale selecting unit 14, and determines the scale of the map actually displayed. The map data retrieving unit 21 acts according to various kinds of requests for displaying of the map and, when the instructed point detecting unit 30 detects a point instructed by the user with respect to the direction/distance mark, the map data retrieving unit 21 receives this, and displays a map upon retrieving the map of the predetermined scale from the map database 31 with these points being located in the center.

For example, when the present invention displays POIs in the POI display mode 5 or when facilities and the like within a range of a particular distance are displayed in the equal distance range specifying mode 3, the POI data searching unit 22 performs search process therefor using the map database 31. This map display unit 18 displays the search result on the actual map or on the direction/distance mark in an overlapping manner.

When, in particular, the present invention operates in the equal distance range specifying mode 3 and the configured range specifying mode, the specified range setting unit 24 performs a function of specifying and setting the range thereof. When, in the equal distance range specifying mode 3 in particular, for example, facilities within a predetermined distance from the reference point are searched and displayed, e.g., within a range of 10 km from the current location, within a range of 20 minutes on foot from the current location, or within 10 minutes by car from the current location, then the inter-reference point distance instruction input unit 25 therein receives an instruction of distance from the reference point which is to be searched at this occasion.

When, in particular, the present invention operates in the configured range specifying mode 4, the multiple point instructed range input unit 26 receives an instruction and a range as follows. When the range is specified by instructing three or more points, the multiple point instructed range input unit 26 receives the instruction of the multiple points and the range based on the instruction at this occasion. When the multiple point instructed range input unit 26 receives the instruction and the range, the range instruction start finish input unit 27 receives a user's instruction indicating that an input for setting a range is started from now on or a user's instruction indicating that the input thereof is finished.

When the instruction of multiple points for instructing a predetermined range is given with this multiple point instructed range input unit 26 as described above, the instructed point position input unit 28 inputs this here. Regarding the points actually instructed by the user at that occasion, when the instructed point detecting unit 30 detects that the user touches the touch panel with a finger and the like, an instructed point is detected based on the position thereof on the screen, and the instructed point position input unit 28 performs this by inputting.

The instructed range detecting unit 29 receives three or more instructed points which are input as described above, and detects a region enclosed by the points thus input. Detecting a predetermined range from multiple points in this manner can be done by using various kinds of methods which are widely used in navigation apparatuses and the like.

As described above, when the instructed point detecting unit detects that the user touches the touch panel pasted onto the screen with a finger and the like, the instructed point detecting unit detects the instructed point based on the position thereof on the screen, and operates in the same manner in various kinds of modes in the present invention. With the map database 31, a vast amount of map data can be saved in a memory chip, a memory card, and the like in recent years. In addition, map data can be retrieved using the Internet network.

A monitor 32 displays, from the image output unit 23, various kinds of images such as map data including POIs provided from the map display unit 18 as described above and the direction/distance mark provided from the direction/distance mark display unit 6. It should be noted, in order to provide operation guidance, search result guidance, and the like to the user, audio guidance may be output from a speaker as necessary.

The present invention including the functional blocks as illustrated in FIG. 1 may be carried out in various kinds of forms by selecting and using various kinds of functional units as described above, but for example, the present invention can be carried out according to each operation mode with operation flows as illustrated in, for example, FIGS. 3, 4, and 9. This will be explained with reference to the functional block diagram of FIG. 1 and examples of screen displays of FIGS. 4 to 9.

Figure 2:
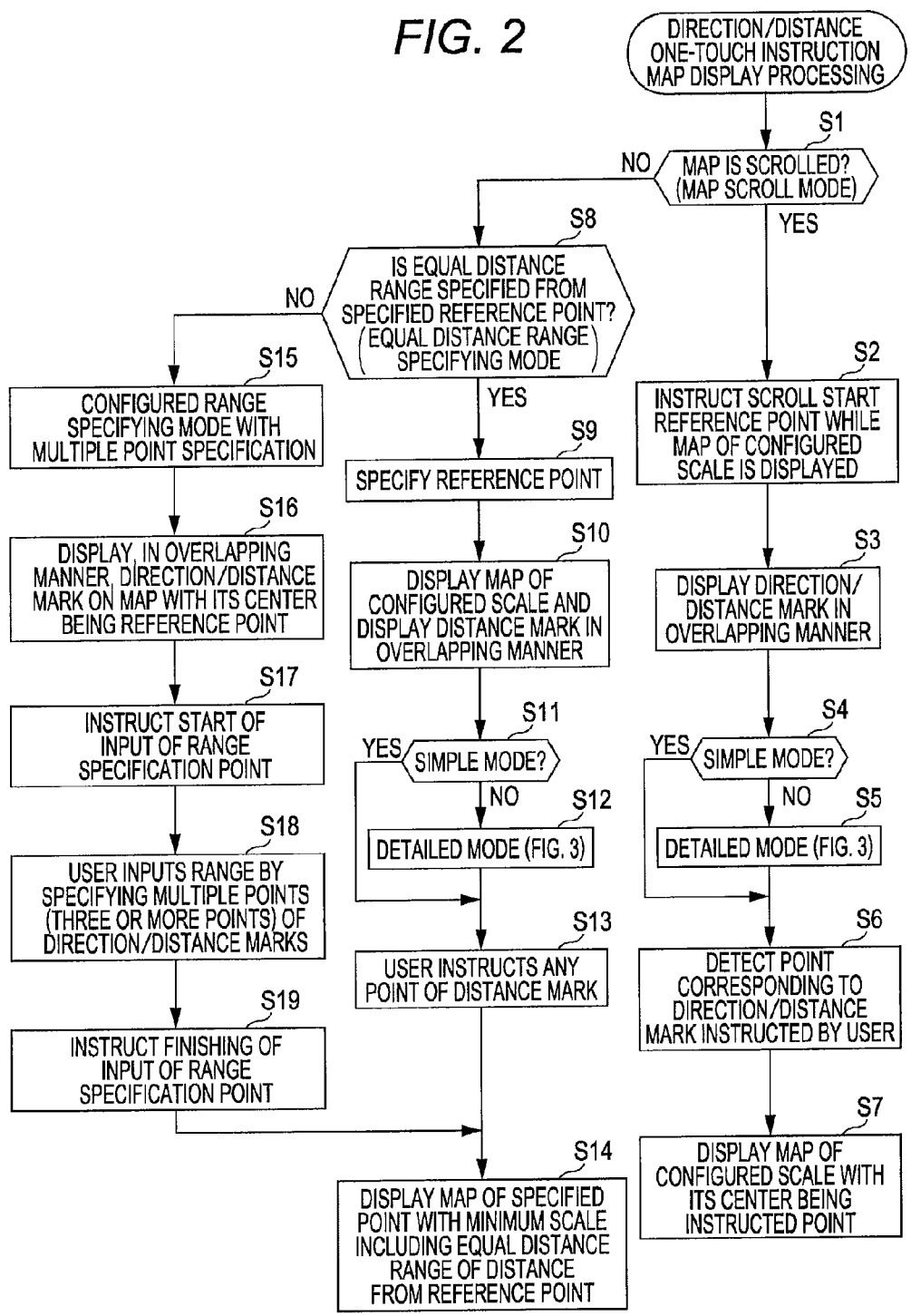
FIG. 2 is a functional block diagram for carrying out a map scroll mode, an equal distance range specifying mode, and a configured range specifying mode in the embodiment.
Figure 9A:
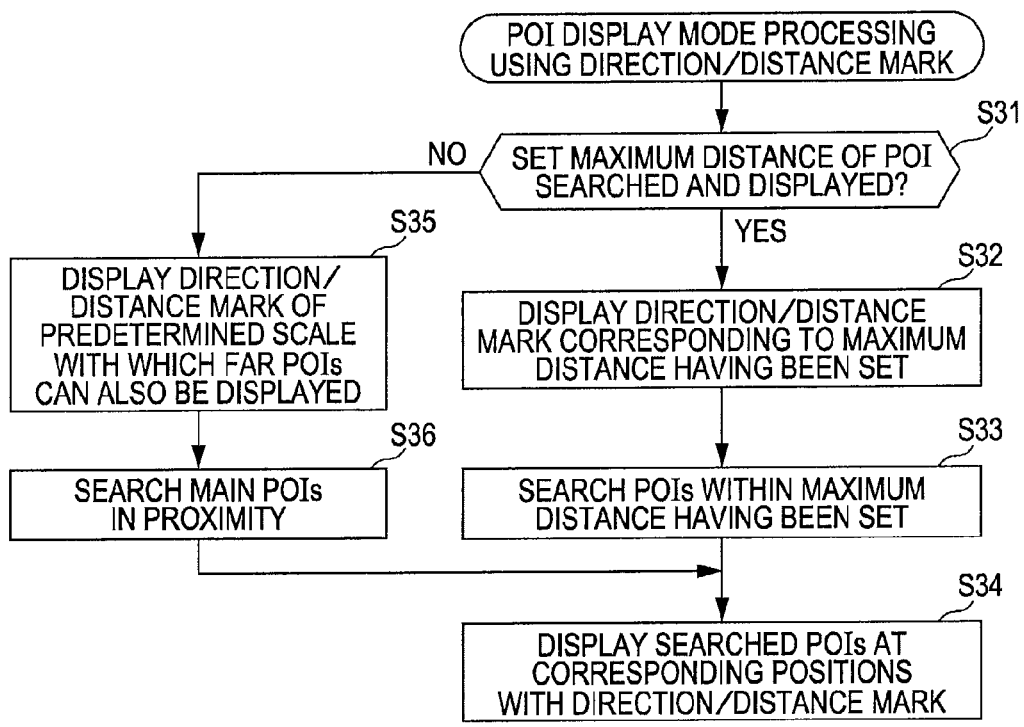

The example of direction/distance one-touch instruction map display processing as illustrated in FIG. 2 shows operation flows carrying out the map scroll mode 2, the equal distance range specifying mode 3, and the configured range specifying mode 4 in the direction/distance mark usage mode selecting unit 1 of FIG. 1. It should be noted that the POI display mode can be carried out by the operation flow as illustrated in FIG. 9A.

In the direction/distance one-touch instruction map display processing of FIG. 2, a determination is made as to whether the map is scrolled at first, i.e., whether the map scroll mode is performed or not (step S1). When it is detected that the user selects the map scroll mode here, step S2 is subsequently performed, and while the map with the configured scale is displayed, the reference point of start of scroll is instructed. In many cases at this occasion, the map is scrolled from the currently displayed map, and accordingly the current location of the currently displayed map is the scroll start point. Alternatively, a particular point may be instructed by the user all over again.

Regarding the scroll start point at this occasion, as explained in the explanation about the current location reference point moving unit 19 in the map display unit 18 of FIG. 1, the mark of the current location is usually arranged in a navigation apparatus and the like, such that the current location is not arranged in the center of the screen so that the proceeding direction can be displayed widely. But in this case, in terms of allowing the user to have correct sense of direction in which the user moves from now on, it is preferable to move the map from the current location such that the current location mark comes to the center of the screen in order to overlay the center of the screen on the direction/distance mark serving as the reference point. Further, when the direction of the map is arranged such that the direction/distance mark displays the upper side of the screen in the north direction, it may be possible to perform processing for displaying the upper side of the screen in the north direction so as to match that direction. The state where such processing is performed is illustrated in FIG. 4A.

Thereafter, in step S3, the direction/distance mark is displayed in an overlapping manner. In this processing, the direction mark display unit 7 in the direction/distance mark display unit 6 of FIG. 1 displays lines indicating directions as illustrated in FIGS. 4B and 4C, and the distance mark display unit 8 displays equal distance circles as illustrated in FIG. 4B or displays equal distance elliptical marks as illustrated in FIG. 4C. It should be noted that, hereinafter, the equal distance circles and the equal distance ellipses are collectively referred to as "equal distance circles".

In the example as illustrated in FIG. 2, in step S4 subsequent thereto, a determination is made as to whether the simple mode is performed or not. In other words, in the present invention, there are modes for setting the details as illustrated in FIG. 3, but the simple mode is also prepared to allow the user to perform the scroll operation with which the user is satisfied in most cases, using the simplest operation as possible, and when, in particular, no instruction of performing the detailed mode is given, the simple mode is performed.

Therefore, when the simple mode is determined to be performed in step S4, step S6 is subsequently performed, and a point corresponding to the direction/distance mark instructed by the user is detected. In this state, as illustrated in FIGS. 4B and 4C, when the user instructs, for example, a point at "50 km northeast" corresponding to the direction/distance mark displayed on the map, the point is detected by detecting this.

The example as illustrated in the figure shows an example in which, when the user instructs the direction/distance mark, a position where a finger and the like is brought into proximity to the screen or a point where a finger and the like is lightly brought into contact therewith is displayed as a balloon on the screen in order to allow the user to easily understand which point is being instructed. Particularly in the present invention, with this kind of display, equal distance circles at outer sides are rougher, i.e., even with the same length on the screen, a distance on the map increases as it goes to the outer side of the screen, and accordingly, it is difficult to find which position is actually the touched position. For this reason, it is important to display the instructed position using such kind of balloon and the like.

Figure 4D:
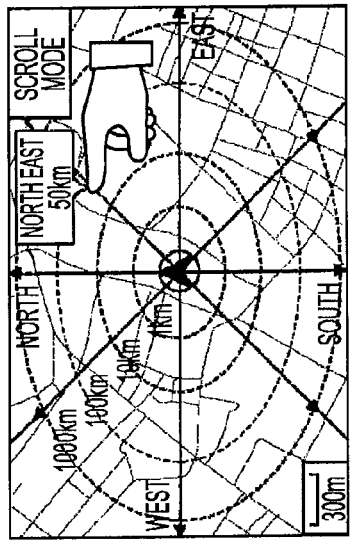

Subsequently, step S7 is performed, and the map with the configured scale is displayed with the specified point being located in the center. As a result of this operation, in the example as illustrated in FIGS. 4A to 4D, the map at 50 km northeast of the current location as illustrated in FIG. 4A is displayed with the same scale as the scale of the map displayed until then, as illustrated in FIG. 4D.

The above operation shows operation when the simple mode is selected in step S4. However, when the detailed mode is selected instead of the simple mode here, for example, the operation as illustrated in FIG. 3 is performed upon, e.g., user's selection of the "detailed mode" in step S4. When the map is scrolled as described above, the example as illustrated in FIG. 3 shows examples of the following processing: performing processing of changing display to any given scale in step S22, performing of changing the distance display unit in step S24, performing processing of changing the scale according to the distance specified in step S27, or any given combination of the above processing.

In the example of the detailed mode processing as illustrated in FIG. 3, it can be performed as the processing of step S5 explained above in FIG. 2, or can be performed as the processing of step S12 in FIG. 2 explained above. In the detailed mode of FIG. 3, step S21 is subsequently performed after step S5 of FIG. 2 is performed, and a determination is made as to whether the distance scale from the reference point is changed or not.

Figure 6A:
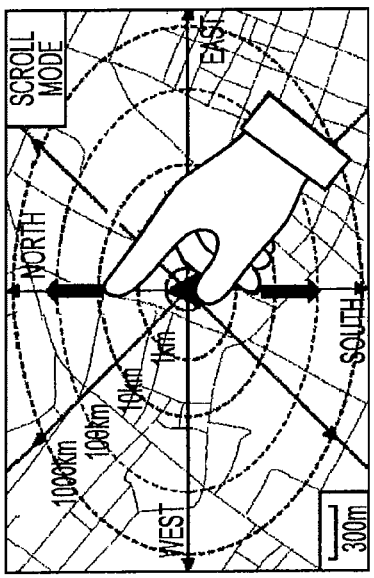
Figure 6C:
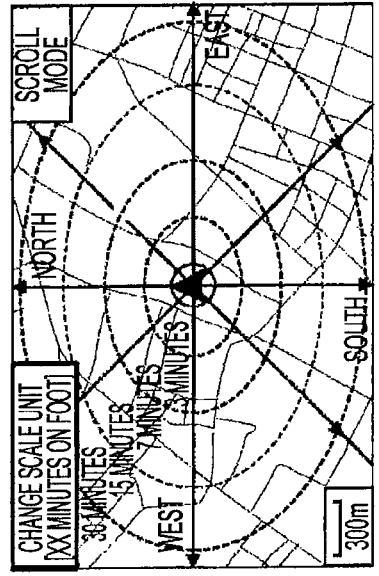

When it is determined that the distance scale from the reference point is to be changed in this case, step S22 is subsequently performed, for example, as illustrated in FIG. 6A, display of the scale is changed to any given scale by, e.g., operation of tracing the display screen so as to expand both fingers. The example as illustrated in FIGS. 6A to 6D shows an example where, with the above operation, the scale whose maximum external diameter portion is initially 1000 km is changed to the scale in which maximum external diameter is 10 km, by expanding the scale as illustrated in FIG. 6B.

In step S21 explained above subsequent thereto, as with the time when it is determined that the unit of the scale does not need to be changed in this time, step S23 is subsequently performed, and a determination is made as to whether the unit of the scale is to be changed or not. When it is determined that the unit of the scale is to be changed here, and when the initial unit of the distance of the direction/distance mark is displayed in "km", then, for example, the unit is changed to units such as "XX minutes on foot" and "XX minutes by car". In the distance mark display unit 8 of the direction/distance mark display unit 8 of FIG. 1, this operation is done by making selection with the distance display unit selecting unit 10.

In this state, FIG. 6C illustrates an example where the unit of "XX minutes on foot" is displayed, and FIG. 6D illustrates an example where the unit of "XX minutes by car" is displayed. With such unit display, when guidance of various kinds of facilities and shops include "get off at XX station, and go 1 km to the east" or "get off at XX station, and walk 15 minutes to the east", a desired map is immediately displayed with such unit, and accordingly, this enables easily finding the facilities.

Likewise, for guidance such as "go about 10 km to the west from XX IC" or "go about ten minutes to the west from XX IC" and further display such as "go about 10 minutes to the south by bus from XX station", a map of a desired point can be easily displayed with a unit display of "XX minutes by car" in the direction/distance mark with that station being located in the center.

The above guidance display is widely used in sightseeing maps and the like, but in many cases, detailed guidance is not provided with regard to not-so-famous sightseeing spots, and the navigation apparatus may not have detailed data. Even in such cases, when the above method according to the present invention is used, it is possible to immediately, easily display a desired map and find a POI of such desired facilities and the like, as long as there exist the direction from major facilities such as a station and an index of distance.

In the example of FIG. 3, thereafter, as with the time when it is determined that the unit of the scale is not to be changed in step S23 explained above, step S25 is subsequently performed, and a determination is made as to whether the current mode is the map scroll mode or not. When the current mode is determined to be the map scroll mode, step S26 is subsequently performed, and a determination is made as to whether display of the scale of the map at the scroll destination is changed or not, for example, it is changed to display of a detailed map in a case of a close distance.

In other words, the detailed mode processing in FIG. 3 is illustrated as a processing commonly performed in both of the processing of the map scroll mode of step S5 of FIG. 2 and the equal distance range specifying mode of step S12 explained later. The processing of step S26 and subsequent steps is applied only in the map scroll mode. When it is determined to be the map scroll mode, a determination is made as to whether the scale of the map is to be changed to the scroll destination in step S26 explained above. When it is determined that the scale of the map is to be changed, i.e., a setting is made in advance to change the scale of the map, for example, the scale is changed to display a map such that, the closer the distance is, the more detailed map is displayed.

This state is illustrated in FIGS. 5A to 5D. The example of FIG. 5A shows an example in which, when an instruction is given to display a map at a relatively close position such as 1 km northeast, on a map in which one division of scale is 300 m, a detailed map in which one division of scale is 50 m is displayed as illustrated in FIG. 5B. In contrast, the example of FIG. 5C shows an example in which, when an instruction of a relatively far point which is 400 km south-southwest is given, for example, a large region map in which one division of scale is 2 km is displayed as illustrated in FIG. 5D.

In FIG. 3, after such processing is performed in step S27, as with the time when it is determined that the scale of the map at the scroll destination is not to be changed in step S26 explained above, step S6 of FIG. 2 is subsequently performed after step S28, and the above operation is performed. When it is determined that it is currently not the map scroll mode in step S25 explained above, it is the equal distance range specifying mode of FIG. 2 as described above in the example of FIG. 3, and accordingly, step S13 of FIG. 2 is subsequently performed after step S29.

By performing the map scroll mode as described above, the direction/distance mark is displayed and the map is scrolled to a desired position with one-touch, so that an appropriate map can be displayed. This method is particularly effective for a navigation apparatus in the United States. More specifically, in the United States, a compass is often provided in a vehicle, and various guidance is given on the basis of the direction and the distance. Therefore, for such guidance, with the present invention, the direction/distance mark can be displayed, and a display of guidance of a direction and a distance from a particular point is used as it is, so that the guided location can be immediately displayed.

In a navigation apparatus provided in a ship, a map at points such as a desired island, a desired fishery, and a desired fishing spot cannot be displayed even though the map is scrolled because there is no landmark therearound. However, according to the present invention, the direction/distance mark is displayed, and this enables easily displaying a map at a desired point even from the sea, and the present invention is extremely useful.

When it is determined that the map scroll mode is to be performed in step S1 of FIG. 2, the mode of the present invention can be carried out with the processing as described above. However, when it is determined that it is not the map scroll mode in step S1, step S8 is subsequently performed in the example as illustrated in the figure, and a determination is made as to whether an equal distance range from a specified reference point is to be specified, i.e., the equal distance range specifying mode is to be performed or not.

In the example as illustrated in FIG. 2, in step S1, the equal distance range specifying mode 3 and the configured range specifying mode 4 of FIG. 1 are performed in the mode for performing the direction/distance one-touch instruction map display processing of FIG. 2 as a mode other than the map scroll mode, and accordingly, in step S8 explained above, when it is the equal distance range specifying mode, step S9 is subsequently performed.

In step S9, the reference point is specified at first in order to perform the equal distance range specifying mode. In other words, in this equal distance range specifying mode, when, e.g., a desired point existing in a predetermined range such as XX km from a particular specified point is known, or a case of a predetermined location of which direction is unknown but distance is known, or when a distance from facilities and the like is known, this mode is employed, and therefore, at first, the point serving as the reference thereof is instructed.

Accordingly, the processing performed here is as follows. When a current location is adopted as a reference such as searching a convenience store at a point away from the current location by XX km or within a range of XX km from the current location, the reference point may be simply arranged in the center of the screen in the currently displayed map, but when, for example, a point such as a point "XX m from XX station" is searched, the "XX station" is displayed first, and then, this is adopted as the reference point.

Thereafter, step S10 is subsequently performed, the map displaying the reference point is adopted as a map with a configured scale as necessary, and a distance mark is displayed on the screen thereof. The reason why the term "distance mark" is used instead of the above "direction/distance mark" is that in this equal distance range mode, an equal distance range from a predetermined reference point is instructed regardless of the direction, and therefore, intentionally, the term "distance mark" is used here. Therefore, in this case, only the scale indicating the distance from the reference point may simply be displayed. However, it is to be understood that it may also be possible to display the map using the same direction/distance mark as that explained above.

Thereafter, in step S11, a determination is made as to whether the mode is to be changed to the simple mode or not, like step S4 explained above. When it is determined that the detailed mode is performed instead of the simple mode, step S12 is subsequently performed, and the detailed mode of FIG. 3 is performed. Since the processing of FIG. 3 is the same as that explained above, the detailed explanation is not repeated here. However, with the processing of step S22, display of the distance scale from the reference point is changed to any given scale, and in step S24, the distance display unit changes display of units such as "km", "XX minutes on foot", and "XX minutes by car", as necessary.

Thereafter, as with the time when it is determined that the simple mode is performed in step S11 explained above, step S13 is subsequently performed, and the user instructs any point of the distance mark. Accordingly, a map of the minimum scale including the range instructed in step S14 is displayed.

Figure 7A:
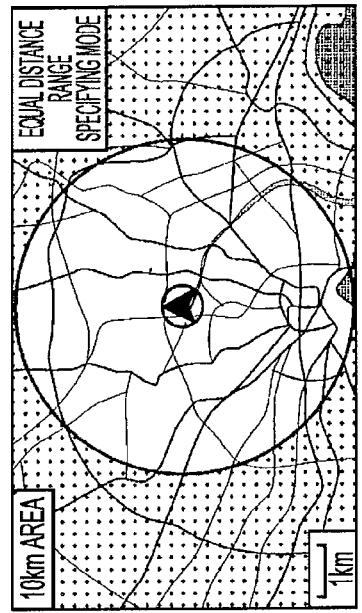
FIGS. 7A to 7D are figures illustrating an action form of the equal distance range specifying mode according to the present invention.
Figure 7B:
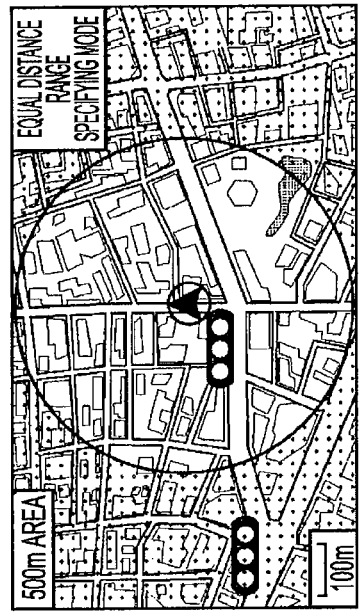

This state is illustrated in FIGS. 7A to 7D. In FIG. 7A, in the equal distance range specifying mode, a map in which one division of scale is 300 m is displayed, and while the reference point is set at the center of the map, the same direction/distance mark as that explained above is displayed, and the user instructs a point of 10 km. Accordingly, as illustrated in FIG. 7B, a map with a scale for a relatively large region in which one division of scale is 1 km is displayed in order to display the specified distance range as largely as possible on the screen, and in order to easily understand the specified range, the specified range is displayed in an easy-to-understand manner, for example, the specified range or the range outside of the specified range is displayed in an appropriate light color.

Figure 7C:
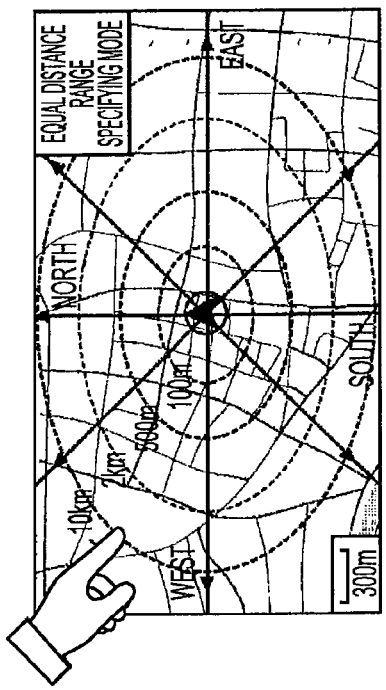
Figure 7D:
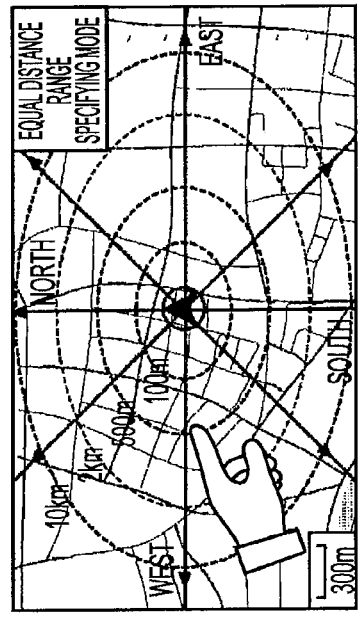

As illustrated in FIG. 7C, when a relatively close distance such as 500 m is specified, a relatively detailed map in which one division of scale is 100 m is displayed in order to display the specified distance range as largely as possible on the screen as illustrated in FIG. 7D. As described above, even with an instruction of an equal distance range from the same instruction screen, an easy-to-see map can be displayed by changing the scale of the map according to the specified distance range.

In the example as illustrated in FIG. 2, when it is determined that the equal distance range specifying mode is not performed in step S8 explained above, the configured range specifying mode is thereafter performed by specifying multiple points as shown in step S15. At this occasion, in step S16, the direction/distance mark is displayed, in an overlapping manner, on the map with the reference point being located in the center. This processing is performed in order to easily instruct various kinds of points in all directions from the reference point. For example, the east side is sea, and therefore, when it is predicted that that direction is not specified, the reference point can also be moved to the east side.

Subsequently, "start" instruction for specifying multiple portions from now on is input (step S17), and thereafter in step S18, the user specifies three or more points required to indicate a given range on the direction/distance mark. Thereafter, when the user determines that the instruction for indicating the desired range is finished, the instruction of "finishing of input" is given (step S19). Thereafter, step S14 explained above is subsequently performed, and like the time of the equal distance range specifying mode, a map with the minimum scale including the specified range is displayed.

The state of this processing is illustrated in FIGS. 8A to 8D, and at first, as illustrated in FIG. 8A, the direction/distance mark is displayed, in an overlapping manner, in a map display state with a scale in which one division of scale is 300 m. With respect to this, in the example as illustrated in the figure, as illustrated in the table of FIG. 8B, a point 30 km in the north direction from the reference point is instructed as a point A. Likewise, a point 40 km northwest of the reference point is specified as a point B, and a point 50 km west of the reference point is specified as a point C, which is specified as the farthest point. Further, this shows an example in which a point 30 km southwest from the reference point is instructed as a point D, a point 25 km south from the reference point is instructed as a point E, a point 20 km southeast from the reference point is instructed as a point F, likewise a point 20 km from the reference point is instructed as a point G, and a point 20 km northeast from the reference point is instructed as a point H.

Accordingly, as illustrated in FIG. 8C, a map is displayed with a scale in which the specified range fits within the screen at the maximum size. The display at this occasion is also displayed so that the outside range and the inside range can be easily understood with appropriate coloring. For example, when there is information indicating that it is not recommended to come closer to a predetermined range from a particular point, this kind of range display can be displayed upon specifying that range, and with the navigation apparatus, it is easy to find what kind of facilities exist in that range.

Further, this can also be used for processing in a navigation apparatus, e.g., searching a route without passing through a specified range because it is dangerous. Likewise, for example, this can also be effectively used for the following processing. Since roads in a predetermined range in a metropolitan area are crowded, this predetermined range is specified, and a route allowing passage without passing through that range is searched.

Figure 9B:
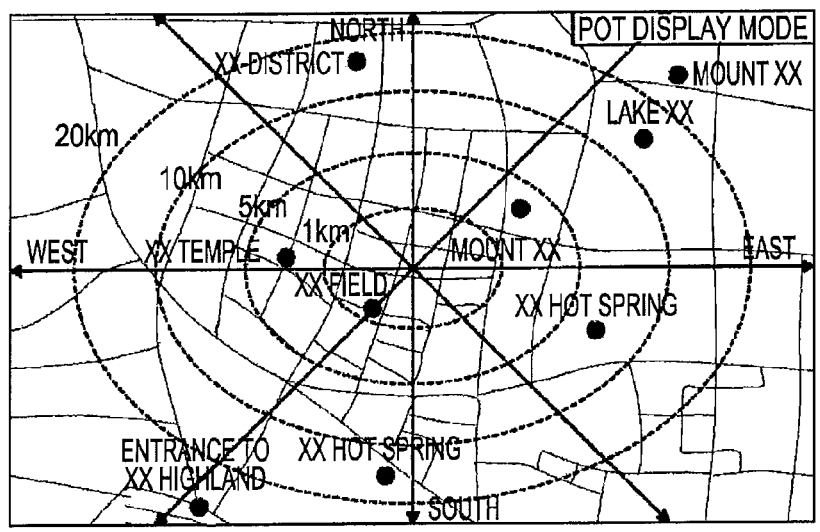
Figure 10A:
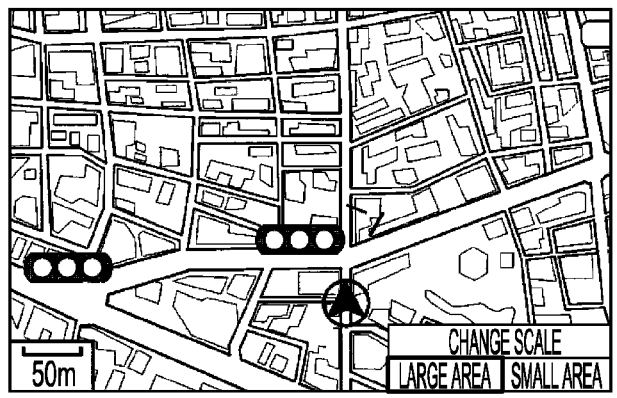
FIGS. 10A and 10B are figures illustrating a conventional example.
Figure 10B:
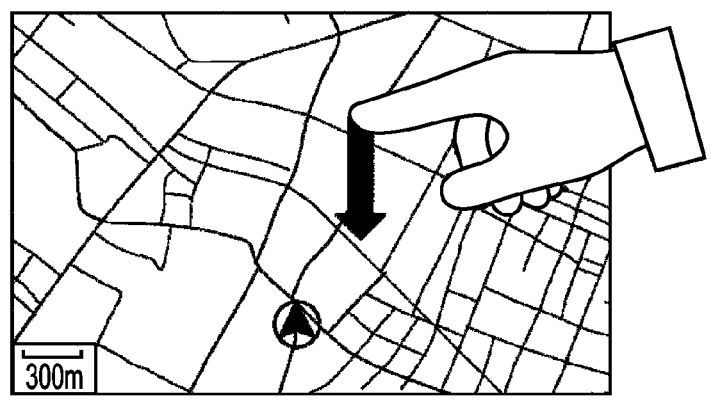

In the present invention, using the direction/distance mark of FIG. 1 explained above, a POI display mode can be performed to display various kinds of POIs on the direction/distance mark without displaying the map, and this processing is illustrated in FIGS. 9A and 9B. More specifically, the example of the POI display mode as illustrated in FIGS. 9A and 9B shows an example where the processing is performed according to the operation flow as illustrated in FIG. 9A, and accordingly, the POIs are displayed as illustrated in FIG. 9B.

More specifically, in the example in which the POI display mode processing using the direction/distance mark of FIG. 9A is performed, at first, a determination is made as to whether the maximum distance of the POIs which are searched and displayed is to be set or not. At this occasion, this mode is used, in many cases, to search of historic sites and the like existing around a particular sightseeing spot and the like. Therefore, in contrast to searching of a range which can be visited on foot, it is considered that it is not necessary to display facilities and the like at a distance in some cases. For example, when it is considered that it is sufficient to display only POIs within 5 km at maximum, a determination is made as to whether the maximum distance is to be set in step S31, and step S32 is subsequently performed.

In step S32, the direction/distance mark corresponding to the maximum distance, which is set at, for example, 5 km, as described above, is displayed. Subsequently, in step S33, POIs are searched in the maximum distance range thus set, or POIs including those outside of the maximum distance range are searched if they are outside of the maximum distance range by only a small distance. Thereafter, the POIs thus searched as well as names and the like thereof are respectively displayed at corresponding positions of the currently displayed direction/distance mark.

In step S31 explained above, when a particular setting is not necessary in the determination as to whether the maximum distance of POIs searched and displayed is to be set or not, and the user wants to know historical spots and the like in a wide range therearound, far POIs are displayed, as necessary, outside of the distance circle of the maximum external diameter without making any particular specification, and step S35 is subsequently performed.

In step S35, a direction/distance mark is displayed with a predetermined scale which allows display of far POIs as described above, and thereafter POIs in a size of area that can be displayed in this direction/distance mark are searched. Thereafter, step S34 is performed, and like the above, the searched POIs are respectively displayed at corresponding positions within the direction/distance mark.

As a result of the processing as described above, in this POI display mode, the searched POIs can be displayed on the screen without any relationship with the map displayed in the background except the reference point, for example, as illustrated in FIG. 9B. Therefore, for example, by displaying the map in the background in a light color at this occasion, the POIs displayed according to the direction/distance mark are preferably displayed in an easy-to-see manner.

In the POI display mode, the display as illustrated in FIG. 9B can be shown by the processing as illustrated in FIG. 9A, but in this display, when the user touches any one of the POIs, an explanation about that POI may be retrieved from the map database and the like, and the explanation may be displayed. Further, by instructing the POI, a map existing around the POI may be displayed. Still further, that may be set as a destination, and a route may be searched with the navigation apparatus.

As described above, with the present invention, using the direction/distance mark, firstly, a map jumped to a predetermined position can be displayed with one-touch, and various kinds of modes can be performed using the direction/distance mark. Therefore, an extremely useful map can be displayed.

Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims.

What is claimed is:

1. A map display apparatus using a direction/distance mark, comprising:
   a map display unit configured to display a map on a display screen;
   a direction/distance mark display unit configured to display a direction/distance mark on the map, the direction/distance mark including:
      a plurality of direction lines, each direction line indicating a respective direction, with a reference point of the screen being located in a center of the map on the display screen,
      a plurality of concentric circles about the reference point; and
      wherein a distance from the reference point is indicated by each concentric circle;
   an instructed point detecting unit configured to detect an instructed point on the screen based on a user touch, as a touch point indicating a direction on the direction/distance mark and a distance from the reference point,
   wherein the map display unit displays a map in response to the detected touch point, and
   wherein the respective scales of the concentric circles are different than a scale of the map.

2. The map display apparatus according to claim 1, wherein the map display unit displays a map including the detected touch point with a same scale as that of a map currently displayed on the display screen.

3. The map display apparatus according to claim 1, wherein the map display unit displays the map, including the detected touch point, and based on the distance from the reference point detected by the instructed point detecting unit, a scale for displaying a more detailed map is selected as the detected distance decreases.

4. The map display apparatus according to claim 1, wherein the map display apparatus facilitates ship navigation.

5. The map display apparatus according to claim 1, wherein the direction/distance mark display unit includes a distance scale change unit configured to change the scale of the concentric circles by changing a distance display from the reference point indicated by each concentric circle of the direction/distance mark.

6. The map display apparatus according to claim 5, wherein the scale of the concentric circles is changed by detecting a tracing operation in a direction in which two fingers of a user in contact with a touch panel are moved away from each other or brought closer to each other.

7. The map display apparatus according to claim 1, wherein the direction/distance mark display unit includes a distance display unit selecting module configured to select, from among a plurality of predetermined units of measure, a unit of measure representing a distance from the reference point indicated by each concentric circle of the direction/distance mark.

8. The map display apparatus according to claim 7, wherein the distance display unit selecting module selects the unit of measure as meters or kilometers.

9. The map display apparatus using the direction/distance mark according to claim 7, wherein the distance display unit selecting module selects a unit of measure indicating an amount of travel time required when traveling by foot.

10. The map display apparatus according to claim 7, wherein the distance display unit selecting module selects a unit of measure indicating an amount of travel time required when traveling by vehicle.

11. The map display apparatus according to claim 1, wherein the direction/distance mark display unit displays a distance from the reference point indicated by each concentric circle such that a distance between each concentric circle increases as the distance from the reference point increases.

12. A map display apparatus using a direction/distance mark, comprising:
   a map display unit configured to display a map on a display screen;
   a direction/distance mark display unit configured to display a direction/distance mark on the map, the direction/distance mark including:
      a plurality of direction lines, each direction line indicating a respective direction, with a reference point of the screen being located in a center of the map on the display screen,
      a plurality of concentric circles about the reference point; and
      wherein a distance from the reference point is indicated by each concentric circle; and
   an instructed point detecting unit configured to detect an instructed point on the screen based on a user touch, as a touch point indicating a distance from the reference point on the direction/distance mark,
   wherein the map display unit displays a map including a distance from the reference point to the detected touch point, and
   wherein the respective scales of the concentric circles are different than a scale of the map.

13. The map display apparatus according to claim 12, wherein the map display unit displays upon selecting the scale of the map with which the range of the distance from the reference point detected by the instructed point detecting unit is displayed, as a large size on the screen.

14. A map display apparatus using a direction/distance mark, comprising:
   a map display unit configured to display a map on a screen;
   a direction/distance mark display unit configured to display a direction/distance mark on the map, the direction/distance mark including:
      a direction line indicating a direction with a reference point of a screen being located in a center,
      a plurality of concentric circles about the reference point;
      a distance from the reference point indicated by each concentric circle;
   an instructed point detecting unit, wherein when the direction/distance mark display unit displays the direction/distance mark, and the instructed point detecting unit detects an instructed point on the screen that is touched, as a touch point, indicating a distance from the reference point on the direction/distance mark; and
   an instructed range detecting unit, wherein when the instructed point detecting unit detects three or more instructed points, and the instructed range detecting unit detects a range based on the instructed points,
   wherein the map display unit displays a map including the range detected by the instructed range detecting unit, and
   wherein the respective scales of the concentric circles are different than a scale of the map.

15. The map display apparatus according to claim 14, wherein the map display unit displays upon selecting the scale of the map with which the range detected by the instructed range detecting unit is displayed, as a large size on the screen.

16. The map display apparatus according to claim 14, wherein the instructed range detected by the instructed range detecting unit is used as a running prohibition section of a navigation apparatus.

17. A map display apparatus using a direction/distance mark, comprising:
- a map display unit configured to display a map on a display screen;
- a direction/distance mark display unit configured to display a direction/distance mark on the map, the direction/distance mark including:
  - a plurality of direction lines, each direction line indicating a respective direction, with a reference point of a screen being located in a center of the map,
  - a plurality of concentric circles with the reference point being located in the center, and
  - a distance from the reference point indicated by each concentric circle; and
- a POI data searching unit configured to search points of interest (POI) from map data,
- wherein when the direction/distance mark display unit displays to the user the direction/distance mark, the map display unit displays, in an overlapping manner, a POI located at a position corresponding to a distance from the reference point and in a direction on the direction/distance mark, and
- wherein the respective scales of the concentric circles are different than a scale of the map.

18. The map display apparatus according to claim 17, wherein when a user specifies a search range of POI using the distance from the reference point, the direction/distance mark display unit displays the distance from the reference point of an outermost circle of the concentric circles, in accordance with a distance from the reference point specified by the user.

* * * * *